Dec. 22, 1964 T. H. SHEEHAN 3,162,065
METHOD FOR FORMING CUTTING ELEMENTS
Original Filed Aug. 4, 1960 5 Sheets-Sheet 1
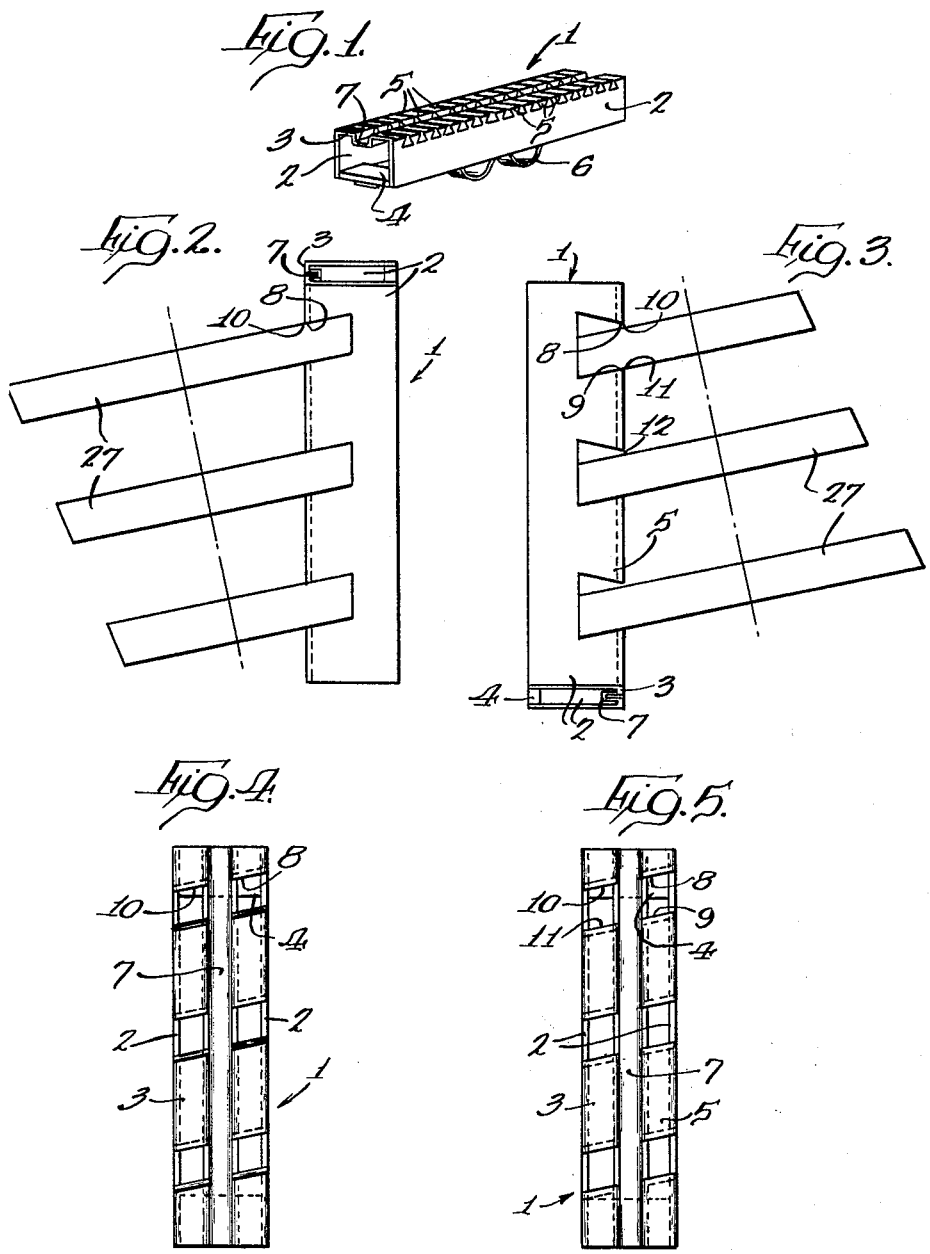
INVENTOR:
Thomas H. Sheehan
BY
George R. Clark
Atty

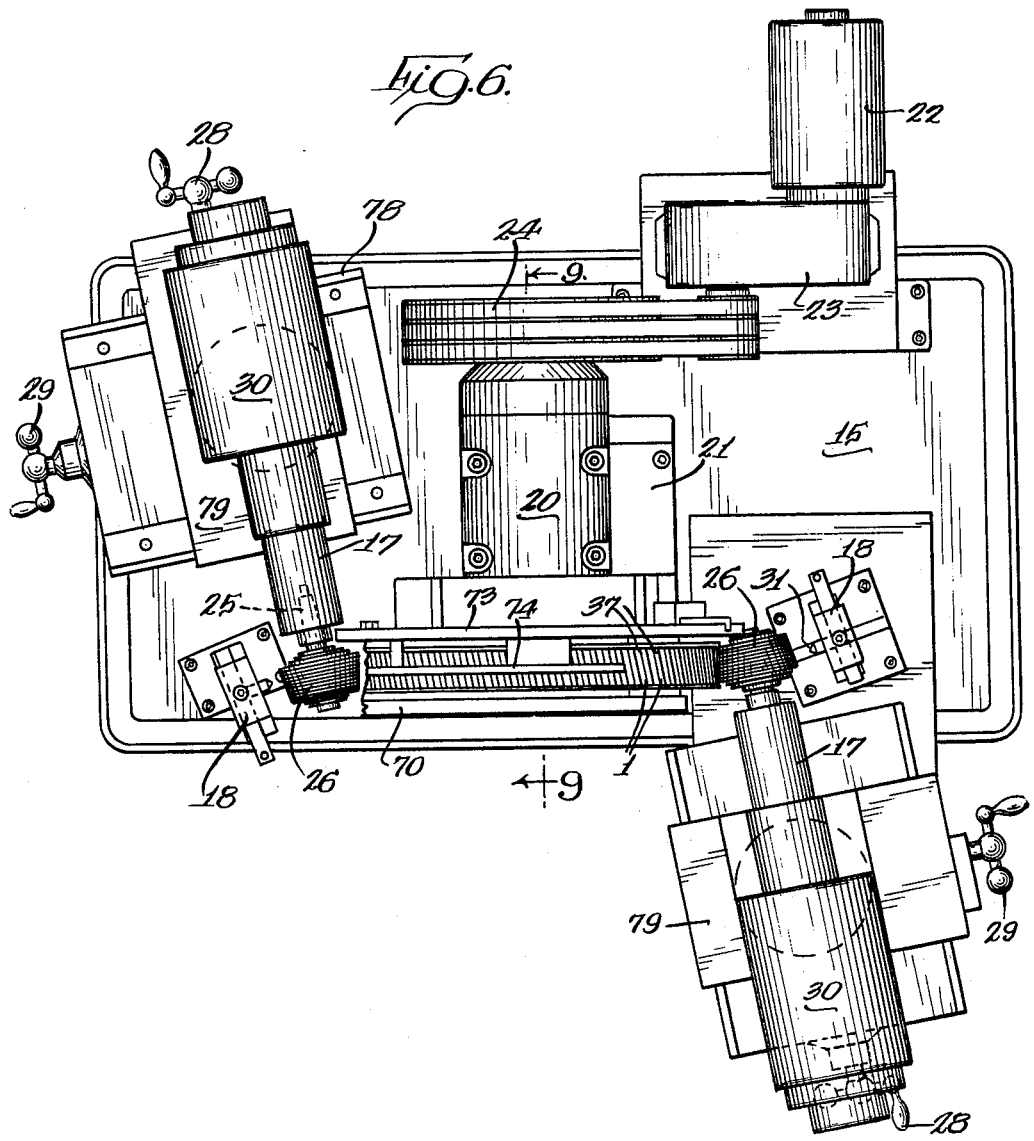

Dec. 22, 1964 T. H. SHEEHAN 3,162,065
METHOD FOR FORMING CUTTING ELEMENTS
Original Filed Aug. 4, 1960 5 Sheets-Sheet 3

INVENTOR:
Thomas H. Sheehan
BY
George R. Clark
Atty

Dec. 22, 1964     T. H. SHEEHAN     3,162,065
METHOD FOR FORMING CUTTING ELEMENTS
Original Filed Aug. 4, 1960     5 Sheets-Sheet 4
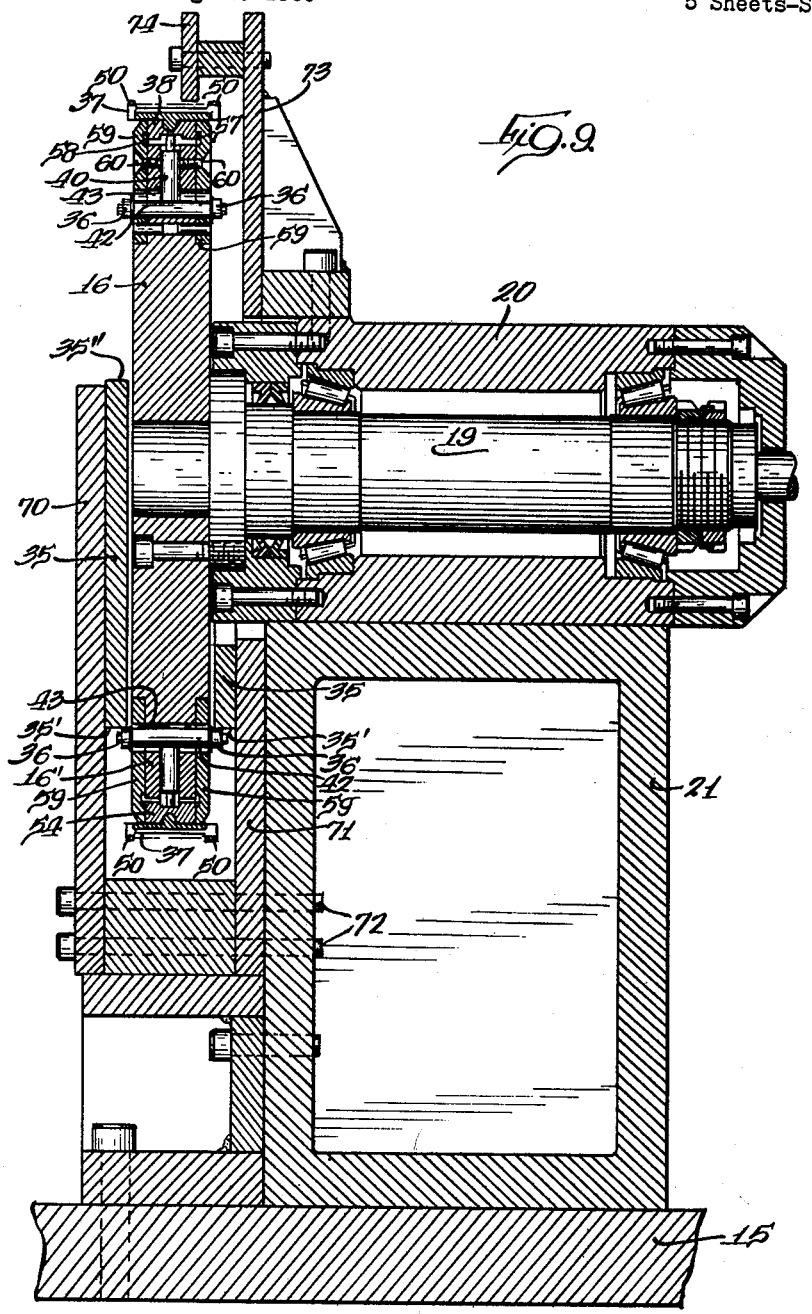
INVENTOR:
Thomas H. Sheehan
BY
George R. Clark, Atty

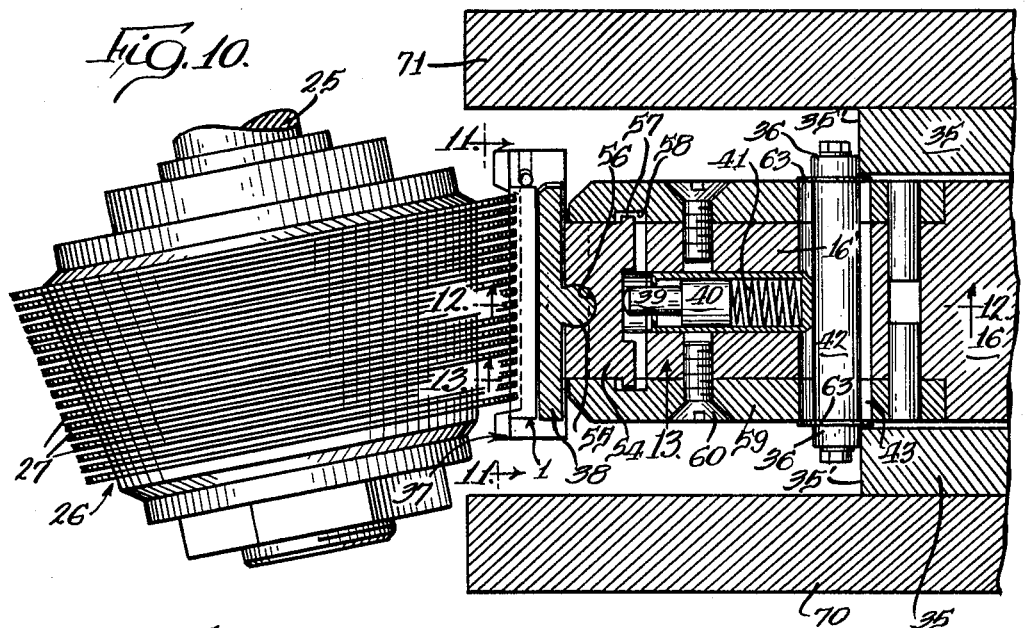
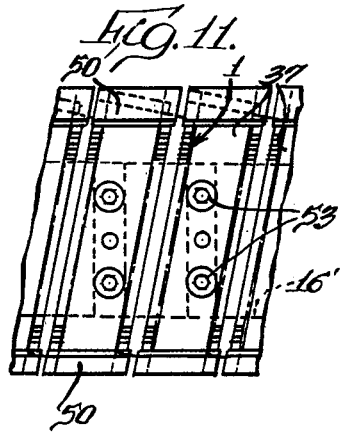
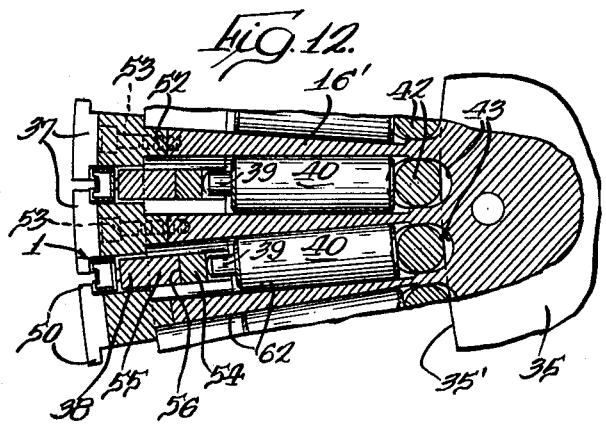
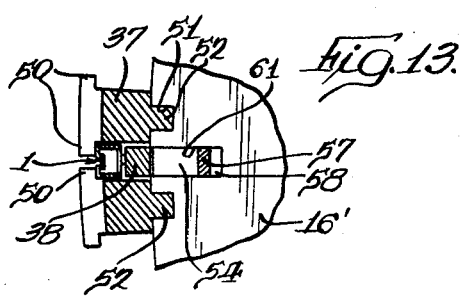

United States Patent Office 3,162,065
Patented Dec. 22, 1964

3,162,065
METHOD FOR FORMING CUTTING ELEMENTS
Thomas H. Sheehan, Chicago, Ill., assignor to Sunbeam Corporation, Chicago, Ill., a corporation of Illinois
Original application Aug. 4, 1960, Ser. No. 47,536, now Patent No. 3,104,500, dated Sept. 24, 1963. Divided and this application Jan. 29, 1963, Ser. No. 254,656
3 Claims. (Cl. 76—104)

This invention relates to an improved method for forming cutting elements and, more particularly, to an improved method for forming undercut teeth on shear cutting tools. This application is a division of my copending application for Apparatus For Forming Cutting Elements, Serial No. 47,536 filed August 4, 1960, now Patent No. 3,104,500, and assigned to the same assignee as the instant application.

The invention will be described in detail in connection with the movable cutting element of a reciprocating type of electric dry shaver. However, such description of my invention is only illustrative of my inventive teachings and is not to be taken as being limiting.

In one well known form of reciprocating type of electric dry shaver the movable cutting elements comprises a generally channel-shaped elongated member. Shearing teeth are integrally defined on the bight portion of the channel-shaped member by slots which extend across said bight portion. It would be desirable to provide said shearing teeth with an undercut. An undercut is advantageous since it provides the teeth with sharp edges which are more efficient and provide a more comfortable shave.

In this type of cutting element undercut shearing teeth and their advantages are well known to those skilled in the art. Nevertheless, until my invention the methods and apparatus for forming said undercut teeth have not provided teeth with hard, sharp edges, and said methods and apparatus also have not been quick, uncomplicated, low cost and efficient.

For instance, one prior art method may comprise first punching openings in flat stock and then coining or swaging the openings to provide an undercut and then lapping the stock to make the edges of the openings sharp. This does not always result in undercut shearing edges which have a high degree of sharpness or provide a comfortable shave. It will be appreciated that a high degree of sharpness is desirable since this reduces the shaving time required and contributes to shaving comfort since with efficient and sharp edges there is no hair pulling or the like. Quick shaving is advantageous since the shaver can be operated at slightly higher speeds without danger of overheating due to reduced total shaving time. Shaving comfort obviously is a very important consideration, and particularly in the case of the shaving of facial hairs or whiskers.

After the prior art method step outlined above it is customary to then form the flat stock into the required channel shape. The subsequent forming operation may introduce undesirable deformations or strains in the teeth of the stock. After the forming operation, the stock is then heat treated in an inert atmosphere and quenched. The stock is conventionally a carbon steel and if the heat treating atmosphere isn't carefully controlled, there may be some de-carburization of the teeth edges. This means that the teeth edges will not have the required degree of high hardness. Therefore, it would be desirable to form the teeth after the stock is fabricated into channel shape and heat treated and quenched. This way there will be no deformations or strains introduced into the teeth since there will be no bending thereof subsequent to their formation. Also, if there is any de-carburization during heat treating the soft outer surface of the stock will be removed by the subsequent teeth forming operations which will leave only teeth edges with the required degree of hardness.

Furthermore, it will be obvious from the above outlined prior art method that several separate and distinct operations are required which do not result in teeth edges which are sharp. These steps are punching, coining or swaging and lapping. It would be an advantage to reduce the number of operations required.

Accordingly, it is an object of this invention to provide an improved method for forming improved undercut teeth on a shearing tool.

It is a further object of this invention to provide an improved method for forming improved undercut teeth on a shearing tool which will overcome the disadvantages mentioned heretofore in prior art methods and apparatus and their products.

A further object of the invention is to provide an improved method for forming improved undercut teeth on the generally U-shaped shear cutting elements of electric dry shavers.

In my invention a grinding operation is used in forming the undercut teeth. This grinding operation takes the place of the heretofore mentioned punching and coining or swaging steps. The grinding operation forms sharper edges than heretofore obtained with punching and coining or swaging. Furthermore, the grinding operation follows the channel forming and heat treating operation. Therefore, harder and more deformation and strain free sharp edges are attained on the shearing teeth than attained with prior art procedures, although it is possible to use my teachings to advantage by grinding before channel forming and heat treating.

In the invention the grinding is preferably performed with a plural disc cone-shaped grinding wheel, and opposite sides of the undercut teeth are formed essentially by mere relative reversal between the stock and wheel. This contributes to manufacturing methods and apparatus which are quick, uncomplicated, low cost and efficient.

The features of my invention which I believe to be novel are set forth with particularity in the appended claims. The invention itself, however, both as to its organization and method of operation, together with further objects and advantages thereof, may best be understood by reference to the following description taken in connection with the accompanying drawings.

In the drawings, FIG. 1 is a perspective view of a shearing tool formed by my invention;

FIG. 2 is a diagrammatic illustration of the relative positioning of the shearing tool and grinding wheel during the first pass of these parts relative to each other;

FIG. 3 is an illustration similar to FIG. 2 during the second pass;

FIG. 4 is a top view of the shearing tool after the first pass;

FIG. 5 is a top view of the shearing tool after the second pass;

FIG. 6 is a top view of one form of apparatus of my invention;

FIG. 9 is a sectional view taken along the line 9—9 of FIG. 6.

FIG. 10 is a sectional view taken along the line 10—10 of FIG. 7;

FIG. 11 is a sectional view taken along the line 11—11 of FIG. 10;

FIG. 12 is a sectional view taken along the line 12—12 of FIG. 10; and

FIG. 13 is a sectional view taken along the line 13—13 of FIG. 10.

Figure 7:
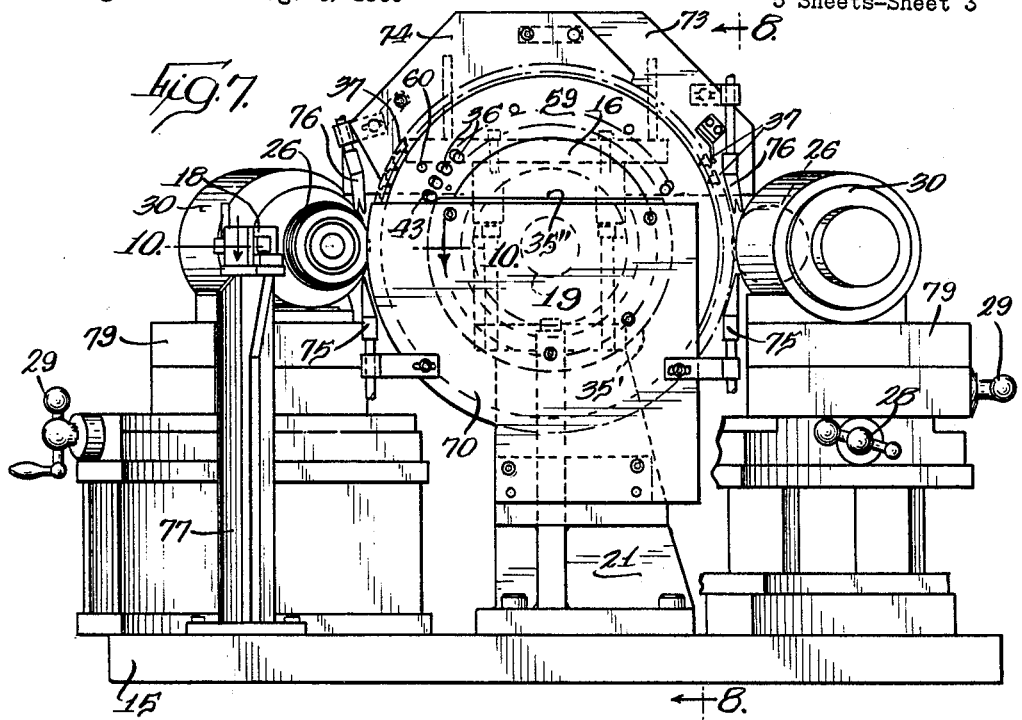
FIG. 7 is a front view of the apparatus.
Figure 8:
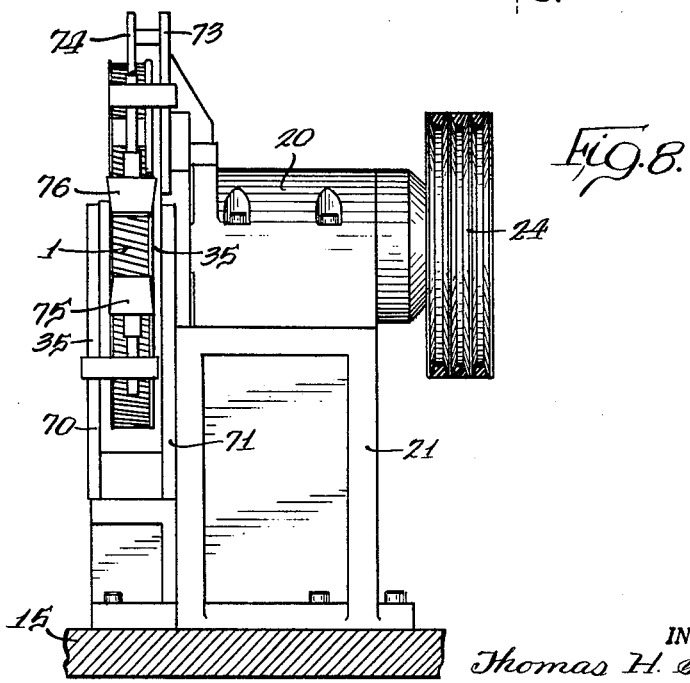
FIG. 8 is a side view from along the line 8—8 of FIG. 7.

Referring now to FIG. 1 of the drawings, illustrated therein is a shear cutting tool 1 which is intended to be used with an electric dry shaver. This cutting tool is exemplary of shearing instruments which can be manufactured by my invention. The particular type of shear cutting tool illustrated in the drawings is intended to be used with an electric dry shaver of the type disclosed in co-pending Ivar Jepson patent application Serial No. 848,102 filed on October 22, 1959, for an Electric Dry Shaver, now Patent No. 3,090,119, and which is assigned to the same assignee as the instant patent application. Although the shearing tool illustrated in the drawings is intended to be reciprocated back and forth in a lengthwise direction with relation to a not shown cooperating outer slotted or apertured stationary comb, it will be appreciated by those skilled in the art that the invention is not restricted to movable shearing tools.

The cutting tool 1 comprises an elongated member which is generally U or channel-shaped in transverse cross section. That is to say, the cutting tool comprises a pair of sides 2 and an inter-connecting bridge or bight portion 3. This U or channel-shape is fabricated from carbon steel stock. A pair of cross pieces 4 are connected to the opposite ends thereof such as by spot welding or the like. After the shearing teeth 5 are formed on the bridge or bight portion and other finishing operations are performed on the element, a spring member 6 is connected to the two cross pieces. The central portion of the spring is corrugated and it is adapted to receive one end of a not-shown operating arm or lever which is driven by the shaver motor so as to reciprocate the cutting element in a lengthwise direction. This spring provides a resilient connection between the cutting element and the operating arm.

The bridge or bight portion has a lengthwise extending central depression 7 formed therein to in effect define two U or channel-shaped parts in the bridge or bight portion. The teeth which are formed on the two U or channel-shaped parts of the bridge or bight portion are aligned with each other and the central depressed portion serves as a strengthening portion. The teeth are formed on the outside of the bridge or bight portion and their opposite sides 8 and 9 are undercut as illustrated in FIGS. 2 and 3. That is to say, the corners 10 and 11 (see FIGS. 4 and 5) of the teeth are the shear cutting edges thereof, and the opposite sides of the teeth converge towards each other when viewed from the inside of the element. The undercut sides of the teeth are inclined at an angle of about eleven degrees with respect to the vertical axis of the teeth inasmuch as this angle of inclination has given excellent results. However, the invention is not necessarily restricted to an angle of about eleven degrees.

The teeth preferably extend angularly across the bridge or bight portion. That is to say, the teeth are inclined at an angle of about eleven degrees with respect to a transverse perpendicular plane through the bridge or bight portion. This particular angle has been selected inasmuch as it provides excellent results. However, the invention is not necessarily restricted to this angle, and the teachings of the invention can also be used to advantage in a shearing element which does not have its teeth extend angularly across the same.

The teeth are formed on the channel or U-shaped member after it is bent into the required configuration and given a heat treating and quenching operation. The teeth are formed in the member by a grinding method and apparatus. After the undercut and angularly disposed teeth are ground in the element, the outer surface of the bridge or bight portion is lapped to give the corners 10 and 11 a very high degree of sharpness and to remove any burrs which may have been formed thereon during the grinding operation. The shearing element is finished by electro-etching the same and giving it a hard chrome finish. The electro-etching is for the purpose of removing any burrs which may be present and which were not removed by the lapping operation. Such burrs may be present at the corners of the teeth adjacent to the sides of U-shaped element.

Referring now to FIGS. 6 to 13 of the drawings, illustrated therein is an apparatus which comprises a table 15 which has a rotary carriage 16 and a pair of rotary spindles 17 and a pair of grinding wheel dressing means 18 mounted thereon. The carriage is generally circular in outline and is vertically disposed with its shaft 19 being mounted for rotation in a bearing housing 20. The bearing housing is mounted on the table on a frame 21. The shaft 19 of the carriage is driven by a motor 22 through a gear reduction mechanism 23 and a pulley belt arrangement 24 which is conventional.

Each of the spindles 17 has an arbor 25 mounted thereon which carries a grinding wheel 26 which has the form of a truncated cone. The grinding wheels 26 are built up out of a plurality of axially aligned and spaced grinding discs 27. The grinding wheels are positioned on diametrically opposite sides of the carriage. The area adjacent the top of the carriage and between the two grinding wheels is a loading and unloading station for the stock which is to be ground by the grinding wheels. Of course, it will be appreciated that the two grinding wheels need not necessarily be positioned on diametrically opposite sides of the carriage.

Each of the spindles is provided with manual adjusting means 28 and 29 for selectively positioning the grinding wheels adjacent to the periphery of the carriage. The adjusting means is conventional and makes it possible for the operator to adjust the grinding wheels lengthwise of the axis of the spindle and also in a direction which is generally perpendicular to the axis of the spindle.

Each of the spindles has motor means 30 for rotating the same independent of rotation of the carriage. Such independent drive means for the spindle is desirable for the purpose of dressing the grinding wheels. The dressing means which comprises a diamond tip 31 is located adjacent to and outboard of the grinding wheels. The dressing means 18 is manually operative for moving the diamond tipped dressing tool along the length of the grinding wheel and in parallel relationship to the cone-shaped peripheral surface of the grinding wheels. When the diamond tipped dressing tool is moved along the grinding wheels the grinding wheels are rotated by the independent drive means 30 for the spindles and in this manner the grinding wheels are dressed so as to maintain the sharp grinding edges on the grinding discs.

The cutting elements are mounted on the carriage so as to be moved past the grinding wheels as the carriage rotates counter-clockwise when viewing FIG. 7 although the direction of rotation can be clockwise. The processed elements are disposed along the periphery of the carriage in parallel relationship. However, they are inclined with respect to the axis of the carriage at an angle of 11 degrees since it is desired to have the teeth extend angularly across the cutting elements at this angle. If the elements were parallel to the axis of the carriage, the teeth would extend perpendicularly across the cutting elements in view of the disclosed disposition of the grinding wheels with respect to the carriage axis. It is possible to have the cutting elements disposed parallel to the carriage axis to provide for this angular disposition of the teeth by proper positioning of the grinding wheels and lengthwise movement of the grinding wheels and elements with respect to each other during grinding. However, it is preferred to provide for this angular disposition of the teeth by inclining the cutting elements with respect to the carriage axis since this arrangement is mechanically much less complicated.

For instance, the spindle axes are parallel to each other and they are disposed in a plane which is common to these axes and the axis of the carriage. The spindle axes are inclined within this plane at an angle of about 11 degrees relative to the carriage axis to provide the 11 degree undercut sides of the teeth. If the cutting elements were not inclined to the axis of the carriage then it would be necessary to tilt the spindle axes out of this plane by 11 degrees in order to have the teeth extend angularly by 11 degrees across the cutting elements. Also, it would be necessary to move the grinding wheels or elements lengthwise as they pass under the grinding wheels.

As heretofore noted, it is within the scope of the invention to position the grinding wheels other than on diametrically opposite sides of the carriage. In such situation the grinding wheel axes would not be parallel to each other and disposed in a common plane with the carriage axis. Nevertheless, for the plane which was common to each grinding wheel axis and the carriage axis each grinding wheel axis would still be inclined only within its corresponding plane provided the cutting elements were angularly disposed on the carriage. Of course, the spindle axes would not be parallel to each other.

Since the grinding wheel axes are inclined to the carriage axis at an angle of 11 degrees this means that the grinding discs 27 are inclined with respect to the cutting elements at an angle of 79 degrees. If is this 79 degree inclination of the grinding discs which accounts of the 11 degree undercut sides of the shearing teeth. Since the grinding wheels grind the opposite undercut sides of the teeth the grinding wheels are reversed with respect to each other. That is, one grinding wheel has its narrow end directed toward one end of the cutting elements and the other grinding wheel is pointed in the opposite direction. Another way of looking at it is to say that the discs of one wheel are inclined toward one end of the cutting element and the discs of the other wheel are inclined the other end. In other words, the wheels 26 have been reversed with respect to each other so that they will form opposite undercut sides of the teeth. It will be obvious to those skilled in the art that opposite sides of the teeth could be formed by a single grinding wheel by reversing the single wheel and the cutting elements with respect to each other end for end grinding opposite sides with the same single wheel. However, two end for end reversed grinding wheels are preferred since this is a much simpler arrangement.

Since the grinding wheels are located on diametrically opposite sides of the carriage their discs are parallel to each other. This would not be true if they weren't so located. In any event, the discs of the end for end reversed wheels are positioned with respect to each other so that the discs of one wheel will enter the cutting elements at substantially the same points as in the case of the other wheel although in a different direction of inclination but at the same angle of 79 degrees. This is illustrated diagrammatically in FIGS. 2 and 3. FIG. 2 corresponds to a top view of the cutting element as it passes under the left hand wheel 26, and FIG. 3 as it passes under the other grinding wheel. A slight clearance 12 is provided between the right hand grinding wheel and the undercut sides 8 formed during the first pass so that these sides and their corners 10 are not destroyed during the second pass.

One reason for using cone-shaped grinding wheels is to obtain a large number of undercut teeth which are identical to each other and have a relatively low height. Obviously, cylindrical shaped grinding wheels having a plurality of spaced grinding discs which are disposed at an angle similar to the cone-shaped wheels could be used to provide undercut teeth. However, the teeth would not be identical but irregular and some of them would have to be quite deep if a relatively large number of them were going to be formed.

The apex of the cone-shape for each wheel 26 has an angle of 22 degrees. That is to say, the sides of the cone-shaped wheels are sloped at an angle of 11 degrees with respect to their axes. Since these axes are tilted 11 degrees with respect to the carriage axis, all the discs 27 of each wheel will simultaneously enter the cutting elements. This means that all the ground teeth will be identical to each other and a large number of them can be formed with relatively shallow ground slots.

In the practice of my invention, it is not absolutely necessary that the carriage be circular. For instance, the carriage could comprise movable fixture means which did not move in a continuous closed cycle. The disadvantage of such an arrangement is that the movable fixture means would have to be reversed periodically. Therefore, preferably the invention is practiced with a carriage or conveyor means which will move the elements continuously in a closed cycle. Additionally, it will be obvious to those skilled in the art that the carriage need not be the movable part of the apparatus, but the carriage could be fixed and the grinding wheels could be caused to move about the carriage. However, the disclosed arrangement is preferred due to its inherent simplicity. Furthermore, although the invention has been explained with respect to teeth which have an 11 degree undercut and an 11 degree angular disposition, the angle of the undercut can be different from the angular disposition of the teeth across the cutting element.

The means for mounting the cutting elements on the carriage 16 and the loading and unloading means will now be described. The carriage 16 is positioned between a pair of cam plates 35. As the carriage rotates between the cam plates, roller cams 36 of the carriage ride on the cam plates for automatically controlling the holding and releasing position of the means for mounting the cutting elements on the periphery of the carriage. In particular, a plurality of spaced mounting elements 37 are angularly disposed along the circumference of the carriage. The cutting elements 1 are inserted between each adjacent pair of mounting elements 37. A pressure plate or pad 38 underlies each cutting element and each pressure pad 38 is urged in an upward direction by a spring biased plunger 39. The plunger is moveable within a cylinder 40 and a spring 41 is inserted inside the cylinder for spring biasing the plunger in an upward direction. The pressure pad 38, spring biased plunger 39 and cylinder 40 can be moved in an outward direction by a pin 42 or the like which underlies the cylinder. The pin is disposed parallel to the axis of the carriage and is movable within a slot 43 formed in the carriage. The rollers 36 are mounted on opposite ends of the pin and positioned so as to ride on the cam plates 35. When the rollers ride along the curved portion 35' of the cam plates, the pin is moved radially outward and the same applied for the cylinder, spring biased plunger and pressure pad. This causes retention of the cutting elements in the space defined between adjacent pairs of mounting elements 37 and the pressure pads 38 by spring pressure. However, when the rollers leave the curved surfaces of the cam plates the cylinder 40 is no longer urged in a radially outward direction but it free to fall radially inward. This relieves the resilient spring pressure on the pressure pad so that the cutting elements can be readily removed. The non-curved portion of the cam plates is indicated by reference numeral 35" and is positioned in the loading and unloading area of the apapratus located at the top thereof between the grinding wheels.

The elements 1 are retained between the mounting members 37 by tabs 50 or the like formed at opposite ends and sides thereof. When the spring pressure on the elements 1 is relieved they can be withdrawn from in between members 37 by sliding them out. The part 16' is an integral extension of carriage 16. At its outer periphery part 16' has a plurality of axially extending spaced slots 51 formed therein. These slots 51 receive lugs 52 or the like formed on the bottom of members 37 for properly aligning the same. The lugs 52 are disposed at an angle of 11 degrees with respect to the lengthwise axis of members 37 so that the latter will be disposed at an angle of 11 degrees with respect to the axis of the carriage 16. The members 37 are retained in their slots 51 by studs 53 or the like extending through members 37 into part 16'.

Since the slots 51 extend parallel to the axis of carriage 16 if it is desired to change the angular disposition of the teeth on the elements 1 this can be readily accomplished by using other member such as 37 which have the desired angular difference between their lugs 52 and lengthwise axis.

The pressure plate or pad 38 is not directly engaged by the plunger 39 but through the intermediary of a pressure block 54. The pressure plate 38 has a swivel connection with the block 54 by virtue of a transverse curved lug 55 formed on the bottom of pad 38 which is received in a similarly curved transverse slot 56 formed in the upper part of blocks 54. Thus the plates or pads 38 can rock slightly about their central portions.

The assembly of the pads 38 and blocks 54 is retained on the carriage by tabs 57 or the like formed on opposite ends of blocks 54 which extend into grooves 58 formed in a pair of annular side carriage plates 59. Plates 59 are retained on carriage 16 by studs 60 or the like. The blocks 54 are received in suitable slots 61 formed in the outer periphery of carriage part 16' between the slot 51. The cylinders 40 and their plungers are positioned within suitable radially extending bores 62 formed in carriage part 16' and the slots 43 extend through the side plates 59 as well as the carriage part 16'. The pins 42 are retained in the slot 43 by washers 63 or the like interposed between the ends of pins 42 and rollers 36.

Front and rear cam mounting plates 70 and 71, respectively, are supported from the bearing support frame 21 by studs 72 or the like on opposite sides of the carriage 16. These mounting plates 70 and 71 support cam plates 35 by means such as not shown studs or the like. Supported on the top of bearing housing 20 is a mounting plate 73 which has a plate 74 supported therefrom. The plates 70 and 71 support lower oil and air pressure deliveres 75 and the plates 73 and 74 support upper oil and air pressure deliverers 76. The deliverers 75 and 76 feed atomized oil and air pressure to the work 1 as it passes beneath the grinding wheels 26 for cooling the work 1 and wheels 26 during the teeth grinding operation. The upper deliverers 76 are branched or Y-shaped so as to deliver atomized oil and air pressure to the grinding wheels 26 as well as the work 1. Cooling of both the grinding wheels and the cutting elements 1 is necessary since the grinding wheels are high speed rubber or the like abrasive wheels. The high speeds and abrasive friction between the work 1 and discs 27 results in the generation of large quantities of heat. If sufficient cooling wasn't provided the discs would become overheated and scorched and wear quickly. Aside from desiring to perform the grinding operation quickly, high speeds are necessary since the rubber or the like abrasive discs are not rigid, but thin and flexible. However, when they are rotated at a high speed centrifugal force in effect makes them act as stiff grinding discs which quickly and accurately grind their way into the steel stock. In one form of the invention the discs 27 had a thinness and spacing on the order of twenty-five thousandths of an inch. They were hard but flexible enough to be bent with finger pressure. However, using rubberized or the like abrasive wheels means that they can be readily formed to the re-required thinness as contrasted with other types of grinding discs. Also, while they are rotating at a high speed they will operate similar to grinding discs constructed from rigid materials but will not have their disadvantage of brittleness or being apt to crack or become chipped. One form of abrasive rubber grinding disc which has provided excellent results is identified by the designation 120 POR, manufactured by the Norton Company of Springfield, Massachusetts.

The dressing means are supported adjacent the wheels 26 on support posts 77. The adjusting means 29 can be used to adjust the depth of cut made by the discs 27 of the wheels 26. The manual adjusting means 28, 29 is conventional and is for the purpose of moving the spindles lengthwise or sidewise on guideways such as 78 as will be readily understood by those skilled in the art.

The apparatus is not limited to forming undercuts of 11 degrees inasmuch as the spindles 17 can have other shaped grinding wheels mounted thereon and the angle between the spindles 17 and the axis of the carriage can be adjusted. The adjusting means for changing the angle between the spindles and carriage axis may comprise a not shown indexed rotatable mounting of the spindle motor housing 30 on its support platform 79, as is well known in the art and diagrammatically illustrated in FIGURE 6 by broken-line circles in the area of parts 30 and 79. Thus, by changing the angle of the spindles 17 and using differently cone-shaped grinding wheels, a wide range of different angles of undercut teeth can be obtained.

While there has been shown and described a particular embodiment of the invention, it will be obvious to those skilled in the art that changes and modifications may be made without departing from the invention, and that it is intended by the appended claims to cover all such changes and modifications as come within the true spirit and scope of the invention.

What is claimed as new and desired to be secured by Letters Patent of the United States is:

1. A method of forming a plurality of closely spaced undercut shearing teeth across the external side of the bight portion of an elongated and generally channel-shaped shear cutting member of electric dry shavers, said method comprising the step of simultaneously engaging all of the discs of a truncated cone-shaped rotary grinding wheel which has plural and closely spaced thin flexible grinding discs with said member at high speed to impart stiffness to said flexible discs and in a direction extending across said member to grind one side of said shearing teeth, and repeating said step but with end for end relative reversal between said member and such a grinding wheel to grind the other side of said shearing teeth.

2. A method of forming a plurality of closely spaced undercut shearing teeth angularly across the external side of the bight portion of an elongated and generally channel-shaped shear cutting element of an electric dry shaver, said method comprising the step of simultaneously engaging all of the discs of a truncated cone-shaped rotary grinding wheel which has plural and closely spaced thin flexible grinding discs with said element at high speed to impart stiffness to said thin flexible discs by centrifugal force and in a direction extending angularly across said element to grind slots therein to form one undercut side of said shearing teeth on one side of said slots, and repeating said step but with relative end for end reversal between said element and such a grinding wheel with the grinding wheel discs being aligned with said slots to form the other undercut side of said shearing teeth on the opposite side of said slots.

3. A method of forming undercut shearing teeth across the external side of the bight portion of an elongated and generally channel-shaped shear cutting member of electric dry shavers, said method comprising the steps of forming said member from carbon steel, heat treating said formed member, simultaneously engaging all of the discs of a truncated cone-shaped rotary grinding wheel which has plural and spaced flexible grinding discs with said member at high speed to impart stiffness to said flexible discs and in a direction extending across the same to grind one side of said shearing teeth, and repeating said engaging step but with relative end for end reversal between said member and such a grinding wheel to grind the other side of said shearing teeth.

References Cited in the file of this patent
UNITED STATES PATENTS 2,183,699   Schweiker _____ Dec. 19, 1939

FOREIGN PATENTS 568,694   Great Britain _____ Apr. 17, 1945